Patented Mar. 5, 1940

2,192,204

UNITED STATES PATENT OFFICE 2,192,204

PROCESSES FOR THE PRODUCTION OF SALTS OF β-METHYL CHOLINE AND ACYL DERIVATIVES THEREOF

Georg Roeder, Rahway, N. J., assignor to Merck & Co. Inc., Rahway, N. J., a corporation of New Jersey No Drawing. Application January 30, 1937, Serial No. 123,153

8 Claims. (Cl. 260—482)

This invention relates to an improved process for the production of β-methyl choline salts and their acyl derivatives.

Morley (Ber. der Deut. Chem. Ges. 13, 1880, p. 1805), has reported a process for the production of β-methyl choline chloride and derivatives thereof from chloro-isopropyl alcohol and trimethylamine. More recently, Major and Cline have produced these β-methyl choline salts by the reduction of trimethylacetonylammonium chloride, and have also produced their acetyl derivatives. (See U. S. Patents Nos. 2,040,145 and 2,040,146, issued May 12, 1936.)

However, each of these processes involves disadvantages which detract from its suitability for the production of β-methyl choline salts and their derivatives on a commercial scale. The process described by Morley requires the use of autoclaves, for technical reasons and, furthermore, it is doubtful if the pure β-isomer can be obtained by this process without further purification.

On the other hand, the halogenated acetones employed as starting materials in the Major and Cline process are not readily available commercial products and great precaution must be taken in their manufacture, because of the pronounced irritating properties which they exhibit.

In an application being filed concurrently herewith, I have described an improved process by which these salts and/or their acyl derivatives may be prepared directly in substantial yield. That process involves reaction between propylene oxide and trimethylamine, followed by neutralization with the appropriate acid and, if desired, subsequent acylation.

However, it sometimes happens that the esters of an acid are more readily available than the acid itself. The present invention, therefore, is more particularly concerned with a process for producing these acylated salts of β-methyl choline in which the acid esters may be employed.

Such a process is particularly desirable in the case of the alkyl-sulfuric acids, for example. The esters of these acids are more readily available substances than the acids themselves, and in addition, the acid component of methyl choline methosulfate would not be stable if its aqueous solution were evaporated, as is required in my other above-described process.

Generally speaking, my new process comprises acylating 1-dimethylamino - 2 - hydroxypropane, and then treating the resulting acyl ester with alkylating agents.

In this way, I have prepared acetyl-β-methyl choline methylsulfate, which would be difficult to prepare by other known processes. This acylated salt of β-methyl choline has considerable technical importance because of its slight hygroscopicity as compared with other derivatives of acetyl-β-methyl choline.

In the following example, I am illustrating a preferred embodiment of my invention which is described by way of illustration and not of limitation, and which may obviously be modified in certain respects without departing from the spirit and scope of my invention.

Example

About 100 gms. of 1-dimethylamino-2-hydroxypropane are dropped into about 200 gms. of boiling acetic anhydride, and refluxed for about two hours. The solution is allowed to stand for about 10 hours, after which time it is shaken to dryness in vacuo. The residue is dissolved in acetic anhydride and then mixed with the calculated quantity of dimethylsulfate. The temperature of the mixture rises spontaneously and it may be necessary to cool the mixture. It is allowed to stand for several hours at room temperature. Ethyl acetate or ether is added to the cold solution and the precipitated acetyl-β-methyl choline methyl sulfate is purified by dissolving it in acetic anhydride and again precipitating with ether or ethyl acetate. It occurs in the form of thin prismatic plates having a melting point of about 90° C.

For dimethylsulfate, other alkylating agents containing a methyl radical may be substituted. Thus, following the esterification of the 1-dimethylamino - 2 - hydroxypropane with boiling acetic anhydride, the mixture may be cooled, the calculated amount of methyl bromide added, and the mixture allowed to stand for about 10 hours. The product is isolated and purified in accordance with the further steps described above in connection with the production of the methylsulfate.

I claim as my invention:

1. A process for the production of acylated β-methyl choline salts which comprises reacting 1-dimethylamino-2-hydroxypropane with an aliphatic acid anhydride, and treating the resulting acyl ester thus obtained with alkylating agents.

2. A process for the production of acetyl-β-methyl-choline methylsulfate which comprises reacting 1 - dimethylamino - 2 - hydroxypropane with acetic anhydride, and treating the resulting acyl ester with dimethylsulfate.

3. Acetyl-β-methyl-choline methylsulfate.

4. A process for the production of acetyl-β-methyl-choline-methylsulfate which comprises reacting 1 - dimethylamino - 2 - hydroxypropane with boiling acetic anhydride, mixing the solution with dimethylsulfate, adding ether, and purifying the precipitated acetyl-β-methyl-choline-methylsulfate by dissolving in acetic anhydride and precipitating.

5. A process for the production of acetyl-β-methyl-choline-bromide which comprises reacting 1 - dimethylamino-2-hydroxypropane with boiling acetic anhydride, mixing the solution with methylbromide, adding ethyl acetate, and purifying the precipitated acetyl-β-methyl-choline-bromide by dissolving in acetic anhydride and precipitating.

6. A process for the production of acetyl-β-methyl-choline chloride which comprises reacting 1-dimethylamino-2-hydroxypropane with boiling acetic anhydride, treating the solution with methylchloride, adding ethyl acetate, and purifying the precipitated acetyl-β-methyl-choline chloride by dissolving in acetic anhydride and precipitating.

7. A process for the production of acylated β-methyl choline salts which comprises acylating 1-dimethylamino-2-hydroxypropane, with an aliphatic acid anhydride, and treating the resulting acyl ester with an alkylating agent.

8. A process for the production of acylated-β-methyl choline salts which comprises reacting 1-dimethylamino-2-hydroxypropane with acetic anhydride, and treating the resulting acetyl ester with an alkylating agent.

GEORG ROEDER.